June 9, 1959

H. PIKAL 2,889,801

APPLE COATING MACHINE

Filed Nov. 16, 1955

INVENTOR.
Harry Pikal
BY
Attorney.

June 9, 1959          H. PIKAL          2,889,801
APPLE COATING MACHINE

Filed Nov. 16, 1955          3 Sheets-Sheet 3

INVENTOR.
Harry Pikal
BY
Attorney

United States Patent Office 2,889,801
Patented June 9, 1959

2,889,801

APPLE COATING MACHINE

Harry Pikal, Bangor, Mich.

Application November 16, 1955, Serial No. 547,057

8 Claims. (Cl. 118—16)

This invention relates to improvements in apple coating machine. The principal objects of this invention are:

First, to provide a machine for automatically and rapidly applying a coating of liquid confection and a coating of ground nut meats to apples.

Second, to provide an apple coating machine which will coat apples without the necessity of embedding a stick in the apples.

Third, to provide a machine that will coat apples and automatically discharge the apples into a wrapper sheet so that the coated apples need not be touched directly by the operator.

Fourth, to provide a machine that will directly engage and hold apples to be coated and apply a coating of hot liquid confection to the apples then rapidly spin off excess confection and immediately apply an overcoating of ground nut meats before the liquid confection has cooled and set and which will perform all these operations without puncturing the skin of the apple and without wasting the liquid confection or unduly spattering the portions of the machine adjacent to the apple spinning station.

Other objects and advantages of the invention will be apparent from a consideration of the following description and claims. The drawings, of which there are three sheets, illustrate a highly practical form of the apple coating machine.

Figure 1:
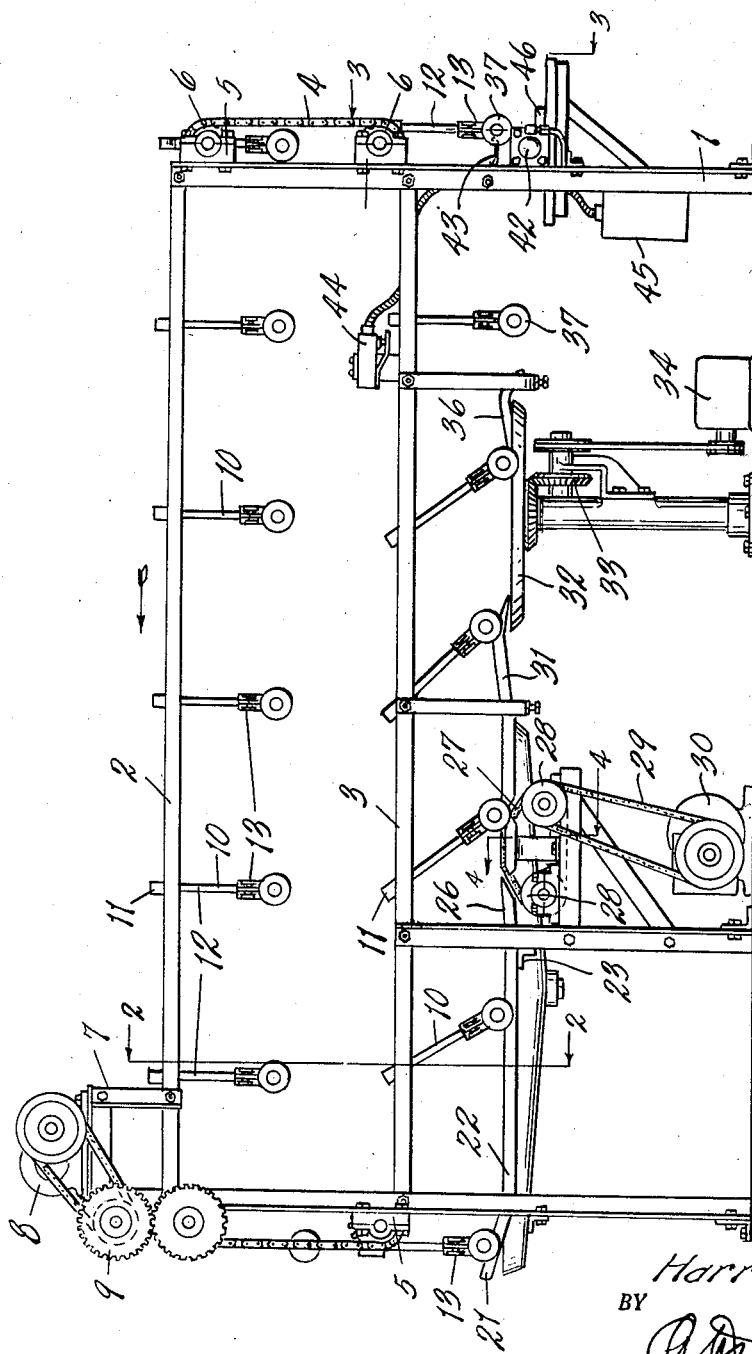
Fig. 1 is a side elevational view of the machine.

Caramel coated apples as an article of food or confection have been known heretofore but have universally been sold with the apples on sticks that serve as a handle both in coating and eating the apple. Placing the stick in the apple not only requires considerable effort but it also breaks the skin of the apple that forms a natural protective covering for the apple and the coated apples consequently spoil quite rapidly. The present invention provides a machine that effectively coats the apples without the use of sticks embedded in the apples and delivers the coated apples to a wrapper sheet that serves as a convenient and sanitary means for holding the finished confection.

The machine includes a suitable framework supported upon uprights 1—1 and having vertically spaced side rails 2 and 3. The side rails 2 and 3 are duplicated in transversely spaced relation to provide supports for spaced conveyor chain loops 4—4 having upper and lower horizontal reaches and upright end reaches. Bearing blocks 5 mounted at the ends of the side rails support sprockets 6 over which the chains 4 are trained. A raised framework 7 on one end of the main frame supports a driving motor 8 and suitable belts and gearing 9 for simultaneously rotating the conveyor chains in the direction indicated by the arrows in Fig. 1.

Figure 2:
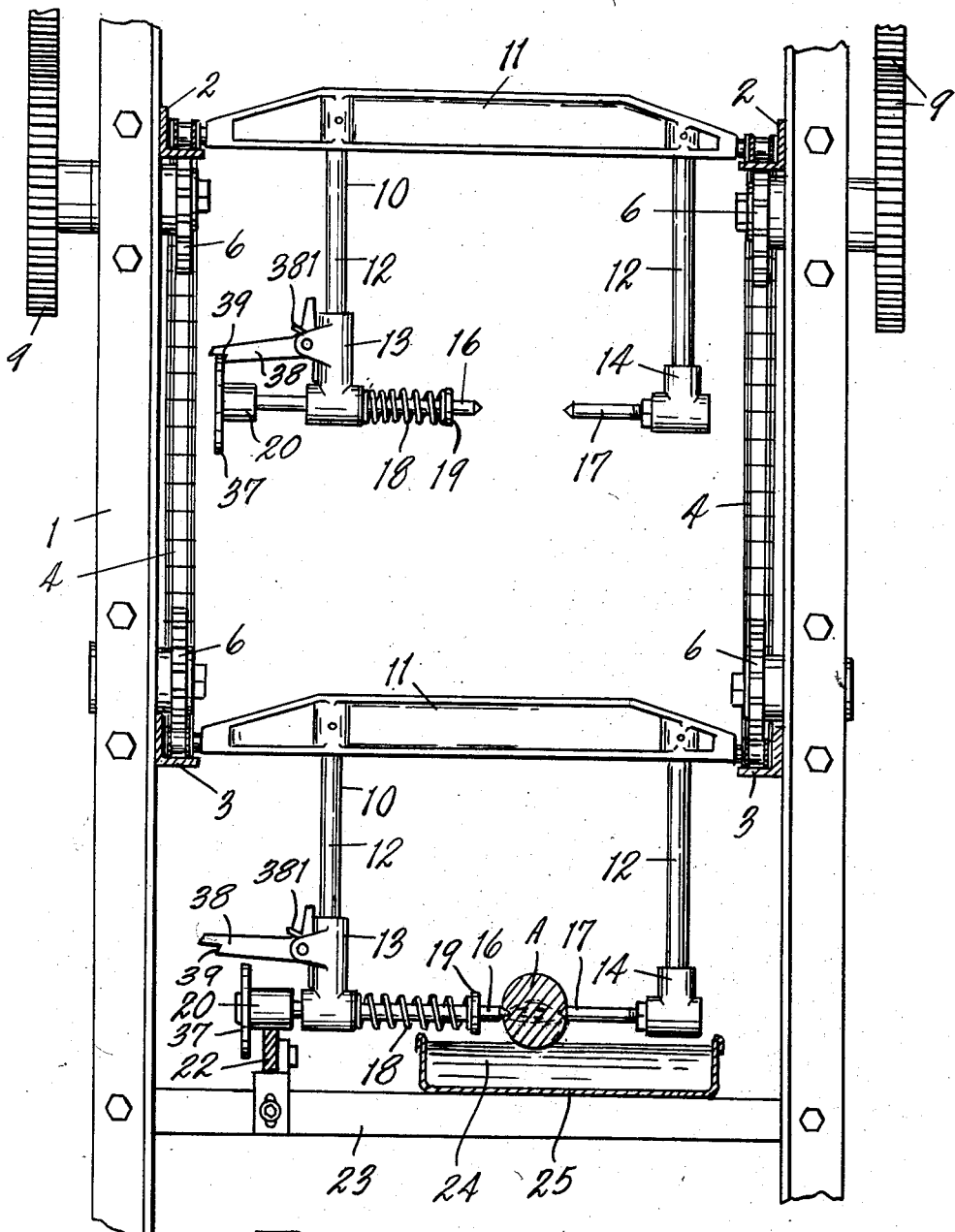
Fig. 2 is a fragmentary transverse cross sectional view taken along the plane of the line 2—2 in Fig. 1.
Figure 4:
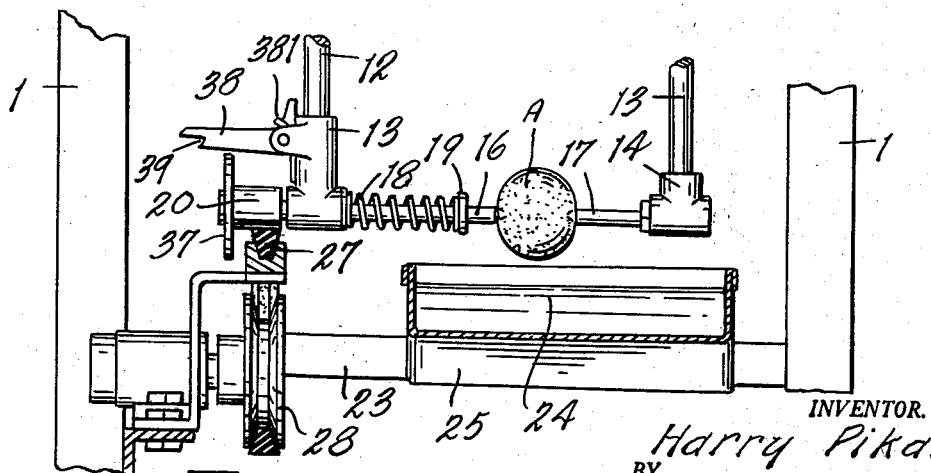
Fig. 4 is a fragmentary transverse cross sectional view taken along the plane of the line 4—4 in Fig. 1.

A plurality of carriers generally indicated at 10 are supported between the conveyor chain loops at spaced intervals along the conveyors. Each carrier 10 includes a cross beam 11 pivotally supported at its ends on the chains 4. Depending below the cross beam 11 are two transversely spaced hanger arms 12 having brackets 13 and 14 at their lower ends. The brackets 13 and 14 are provided with aligned transversely extending bearings 15 that rotatably receive chucking pins 16 and 17. The chucking pins 17 are axially fixed in their bearings but the pins 16 are axially slidable and biased toward the pins 17 by spring 18 bearing against the collars 19. Rollers 20 on the outer ends of the pins 16 limit the inward motion of the pins 16 so that the pins 16 and 17 are spaced apart by about the length of the smallest apple to be coated. It will be appreciated that the weight of the arms 12 and the apples carried thereby causes the carriers to hang vertically below the cross beams 11 at all times except when deflected from the vertical by some outside force. The chucking pins 16 and 17 are pointed to fit within the recessed ends of an applie without puncturing the skin of the apple as is best illustrated in Figs. 2 and 4. The carriers with apples mounted between the chucking pins move to the left along the upper side rails 2 as illustrated in Fig. 1 and descend along the left end of the framework until the rollers 20 on the chucking pins 16 engage and are deflected to the right by an inclined guide rail 21. The guide rail 21 is supported by a horizontal guide rail 22 carried by cross members 23 so that the arms 12 are inclined downwardly and to the right and advanced along the lower side rails 3 with the chucking pins and the rollers 20 rolling along the guide rail 22. The elevation of the guide rail 22 is fixed so that the lower portions of the apples A depend into a bath of heated and liquid caramel 24 contained in a dip tank 25. The rolling motion of the chucking pins and the apples causes substantially the entire surface of the apples to become coated with the heated liquid confection. The trailing or right end of the guide rail 22 is inclined upwardly as at 26 (see Fig. 1) to elevate the apples above the level of the liquid confection.

Positioned at the end of the inclined portion 26 of the guide rail is a short belt loop 27 trained around pulleys 28 to support and drivingly engage the rollers 20 on the chucking pins. The belt loop 27 and the pulleys 28 are rapidly rotated by a belt 29 and motor 30 to spin apples and throw off excess liquid confection by centrifugal force. Since the axis of rotation of the apples is horizontal, liquid is thrown both downwardly into the tank 25 and upwardly and for this reason the hanger arms 10 are of substantial length to position the cross beams 11 out of range of liquid thrown upwardly. The liquid then falls back into the tank and the parts of the machine do not become coated with wasted caramel.

After passing the spinning belt 27, the rollers 20 are carried by a guide rail 31 until the apple carried by the chucking pin is over one side of the table 32. The table 32 is rotatably driven by gears 33 and motor 34 in offset relation to the path of the apple so that the apple moves in chordal relation against the rotation of the table. The table is adapted to support a layer of ground nut meats which are supplied either manually or by automatic means not illustrated to apply an overcoating of nut meats to the periphery of the caramel coated apple as indicated at 35 in Fig. 3. It is essential that the nut means be applied to the caramel coating before the caramel has cooled and while it is still soft and sticky so it is desirable to locate the table 32 in close proximity to the spinning belt 27. After the nut meat coating is applied a guide rail 36 picks up the rollers 20 and elevates the apple as it moves off of the table 32.

Figure 3:
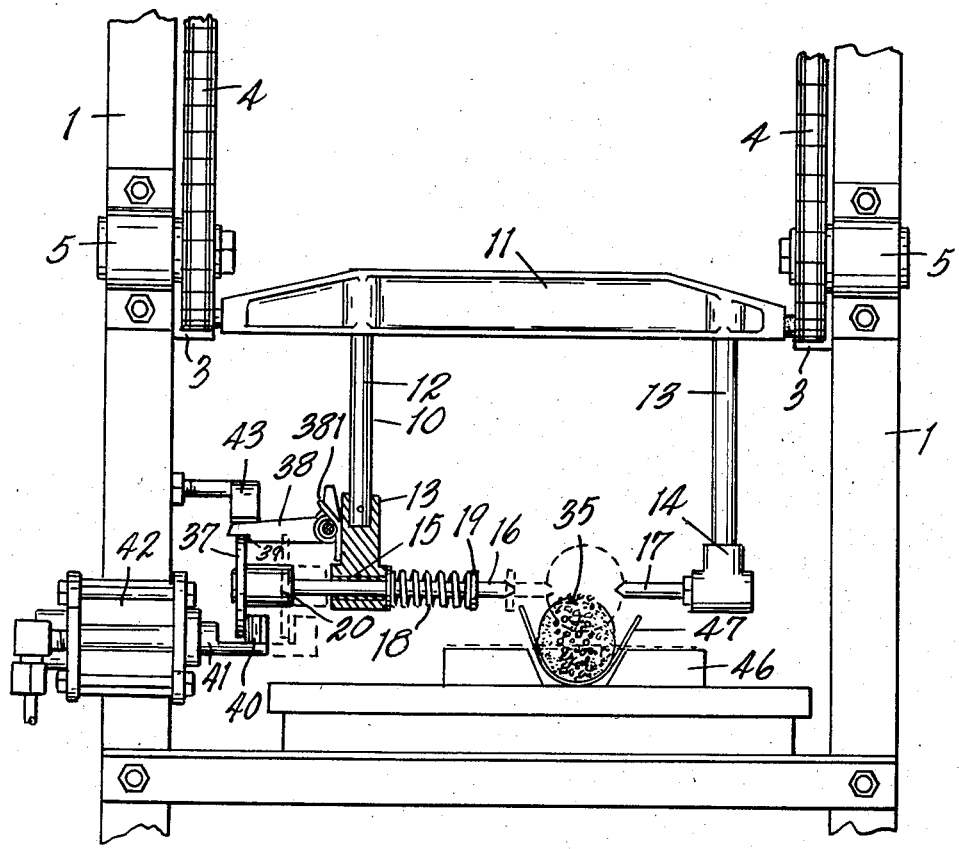
Fig. 3 is an end elevational view of the machine partially broken away in vertical cross section along the plane of the line 3—3 in Fig. 1.

In order to facilitate loading and unloading of apples to and from the chucking pins 16 and 17, each roller 20 is provided with an annular collar or stop 37 and each bearing bracket 13 is provided with a pivoted latch 38 with a notch 39 in its outer end. The latch 38 is spring biased upwardly toward disengaged position by a coil spring 381 and normally assumes the position illustrated in Fig. 2. As the stops or collars 37 on the rollers 20 approach the right end of the framework they move along the outside of a retractor plate or release member 40 carried by the piston 41 of a pneumatic cylinder 42. At the same time the latch 38 moves under a depressing spring 43 that acts as a hold down means and depresses the latch into sliding engagement with the top of the collar or stop 37. A switch 44 tripped by the following carrier 10 actuates an electromagnetic valve 45 to actuate the cylinder 42 and retract the piston 41 and plate or release member 40 so that the collar 37 is moved outwardly and the latch 38 is pressed downwardly till its notch 39 locks against the edge of the collar 37 as illustrated in Fig. 3 and in the upper portion of Fig. 2. This automatically retracts the chucking pin 16 and the coated apple falls into a notch in the receiving block 46. A piece of wax paper 47 placed over the receiving block prior to delivery of the apple will be folded upwardly as shown in Fig. 3 to form a convenient wrapper for the coated apple so that it can be handled and packed without touching the sticky coating.

The pressure of the spring 18 on the chucking pin 16 is sufficient to hold the latch 38 engaged with the collar 37 as the carrier moves upwardly along the right end of the framework. The chucking pins 16 and 17 are therefore held in widely spaced relation and it is a simple matter for the operator to press a new apple between the pins as the conveyor is advanced. A slight push on the chucking pin 16 releases the latch 38 which then moves upwardly and the chucking pin 16 then automatically moves the apple against the opposing pin 17. This reloading operation is conveniently performed immediately after the coated apples are released and as the carriers 11 move upwardly along the upwardly moving reaches of the chains at the right end of the machine as viewed in Fig. 1.

Having thus described the invention, what is claimed as new and is desired to be secured by Letters Patent is:

1. An apple coating machine comprising a pair of parallel conveyor chains arranged to travel in spaced vertical loops, cross bars rotatably supported at their ends by said chains in spaced relation around said loops, laterally spaced pairs of hanger arms depending from said cross bars, opposed apple chucking pins rotatably carried by the lower ends of said arms in parallel relation to said cross bars with their ends in spaced relation and adapted to supportingly engage the recessed ends of apples, one of said pins of each pair extending slidably through its supporting arm and being spring biased toward the other pin of the pair, a roller on said one pin, circular stops on the outer ends of the moveable pins of each pair, latches on said arms engageable with the stops to hold the pins retracted, said latches being biased to disengaged position, a confection trough positioned closely under the path of travel of said pins to immerse the bottoms of apples engaged by said pins, a rail alongside said trough engageable with said rollers to roll apples in the trough, a driven belt at the end of said rail and above the end of the trough to engage the rollers and spin excess confection from the apples, a guide rail at the end of said belt inclined upwardly to engage the pins and lift the apples and said arms, a rotatable table adapted to hold a crushed solid confection positioned with a portion closely under the end of said guide rail to rollingly receive and support freshly coated apples, a discharge station positioned under an upwardly moving reach of said conveyors and having a recessed support located under apples carried by said pins, a release member engageable with said stops at said station and actuated in timed relation with said conveyors to release apples onto said support, and hold down means at said station to depress said latches into locked engagement with said stops as said stops are retracted.

2. An apple coating machine comprising a pair of parallel support and drive members arranged to travel in spaced vertical loops, cross bars rotatably supported at their ends by said members in spaced parallel relation around said loops, laterally spaced pairs of hanger arms depending from said cross bars, opposed apple chucking pins rotatably carried by the lower ends of said arms in parallel relation to said cross bars and adapted to supportingly engage the recessed ends of apples, one of said pins of each pair extending slidably through its supporting arm and being spring biased toward the other pin of the pair, a roller portion on said one pin, circular stops on the moveable pins of each pair, latches on said arms engageable with the stops to hold the pins retracted, said latches being biased to disengaged position, a confection trough positioned closely under the path of travel of said pins to immerse the bottoms of apples engaged by said pins, a rail alongside said trough engageable with said roller portions to roll apples in the trough, a driven belt at the end of said rail and above the end of the trough to engage the roller portions and spin excess confection from the apples, a guide rail at the end of said belt to engage the pins and support the apples and said arms, a rotatable table adapted to hold a crushed solid confection positioned with a portion to rollingly receive and support freshly coated apples delivered off of said guide rail, a discharge station positioned under said support and drive members and having a support located under apples carried by said pins, a release member engageable with said stops at said station and actuated in timed relation with said support and drive members to release apples onto said support, and hold down means at said station to engage and move said latches into locked engagement with said stops as said stops are retracted.

3. An apple coating machine comprising a pair of parallel support and drive members arranged to travel in spaced vertical loops, cross bars rotatably supported at their ends by said members in spaced parallel relation around said loops, laterally spaced pairs of hanger arms depending from said cross bars, opposed apple chucking pins rotatably carried by the lower ends of said arms in parallel relation to said cross bars and adapted to supportingly engage the recessed ends of apples, one of said pins of each pair extending slidably through its supporting arm and being spring biased toward the other pin of the pair, a roller portion on one of said pins, a confection trough positioned closely under the path of travel of said pins to immerse the bottoms of apples engaged by said pins, a rail alongside said trough engageable with said roller portions to roll apples in the trough, a driven belt at the end of said rail and above the end of the trough to engage the roller portions and spin excess confection from the apples, a guide rail at the end of said belt to engage the pins and support the apples and said arms, and a rotatable table adapted to hold a crushed solid confection positioned with a portion to rollingly receive and support freshly coated apples delivered off of said guide rail.

4. An apple coating machine comprising a conveyor arranged to travel in a loop, carriers supported by said conveyor in spaced parallel relation around said loop, laterally spaced pairs of hanger arms swivelly depending from said carriers, opposed apple chucking pins rotatably carried by the lower ends of said arms in parallel relation to the swivel axes of the arms adapted to supportingly engage the recessed ends of apples, one of said pins of each pair extending slidably through its supporting arm and being spring biased toward the other pin of the pair, a roller portion on one of said pins, stops on the moveable pins of each pair, latches on said arms engageable with the stops to hold the pins retracted, said latches being biased to disengaged position, a confection trough positioned closely under the path of travel of said pins to immerse the bottoms of apples engaged by said pins, a rail extending along said trough engageable with said roller portions to roll apples in the trough, a driven member at the end of said rail and above the end of the trough to engage the roller portions and spin excess confection from the apples, a rotatable table adapted to hold a crushed solid confection positioned with a portion to rollingly receive and support freshly coated apples delivered from said member, a discharge station positioned under said conveyor behind said table and having a support located under apples carried by said pins, a release member engageable with said stops at said station to release apples onto said support, and hold down means at said station to engage and move said latches into locked engagement with said stops as said stops are retracted.

5. An apple coating machine comprising a pair of support and drive members arranged to travel in loops with spaced parallel reaches, hanger arms depending swingably from said members in spaced parallel relation at said reaches, opposed apple chucking pins rotatably carried by the lower ends of said arms in parallel relation to the swivel axes of the arms with their ends adapted to supportingly engage the recessed ends of apples, one of said pins of each pair extending slidably through its supporting arm and being spring biased toward the other pin of the pair, a roller portion on said one pin, a confection trough positioned closely under the path of travel of said pins to immerse the bottoms of apples engaged by said pins, a rail extending along said trough engageable with said roller portions to roll apples in the trough, a driven belt at the end of said rail and above the end of the trough to engage the roller portions and spin excess confection from the apples, and a rotatable table adapted to hold a crushed solid confection positioned with a portion to rollingly receive and support freshly coated apples delivered from said belt.

6. An apple coating machine comprising a conveyor arranged in a vertical loop with a horizontal lower reach and an upwardly moving reach at the trailing end of said horizontal reach, carriers projecting from the side of said conveyor and having laterally spaced arms depending swingably below the carrier, chucking members projecting in opposed relation toward each other from the swinging ends of said arms and being relatively moveable and spring pressed toward each other, said chucking members being rotatable in said arms in parallel relation to the swivel axes of the arms to rotatably support an apple, stops on moveable chucking members on each carrier, a release member engageable with said stops adjacent the end of said horizontal reach and at the bottom of said upwardly moving reach to retract the moveable chucking members and release apples from the chucking members, latch means carried by each arm carrying the moveable chucking members and biased out of engagement with the chucking members, a rail positioned adjacent said release member and engageable with said latch means to move said latch means into locking engagement with the moveable chucking members in the retracted position of the chucking members, and means positioned along and below said horizontal reach ahead of said release member to apply confection to the surface of apples held in said chucking means, said last means including a tank for liquid confection and a table for comminuted solid confection and guide rails operatively engageable with said arms to swing said arms and apples carried thereby successively into position in said tank and on said table.

7. An apple coating machine comprising a conveyor arranged in a vertical loop with a horizontal lower reach and an upwardly moving reach at the trailing end of said horizontal reach, carriers projecting from the side of said conveyor and having laterally spaced arms depending swingably below the carrier, chucking members projecting in opposed relation toward each other from the swinging ends of said arms and being relatively moveable and spring pressed toward each other, said chucking members being rotatable in said arms in parallel relation to the swivel axes of the arms to rotatably support an apple, and means positioned along and below said horizontal reach to apply confection to the surface of apples held in said chucking means, said last means including a tank for liquid confection and a table for comminuted solid confection and guide rails operatively engageable with said arms to swing said arms and apples carried thereby successively into position in said tank and on said table.

8. An apple coating machine comprising a conveyor arranged in a vertical loop with a horizontal lower reach and an upwardly moving reach at the trailing end of said horizontal reach, carriers projecting from the side of said conveyor and having laterally spaced arms depending swingably below the carrier, chucking members projecting in opposed relation toward each other from the swinging ends of said arms and being relatively moveable and spring pressed toward each other, said chucking members being rotatable in said arms in parallel relation to the swivel axes of the arms to rotatably support an apple, and means positioned along and below said horizontal reach to apply confection to the surface of apples held in said chucking means, said last means including a tank for liquid confection and a guide rail operatively engageable with said arms to swing said arms and apples carried thereby successively into position in said tank.

References Cited in the file of this patent

UNITED STATES PATENTS

| | | |
|---|---|---|
| 1,965,056 | Rieke | July 3, 1934 |
| 2,663,281 | Wright et al. | Dec. 22, 1953 |
| 2,695,590 | Zuercher | Nov. 30, 1954 |
| 2,695,595 | Hagerman | Nov. 30, 1954 |
| 2,698,802 | Boon | Jan. 4, 1955 |
| 2,731,942 | Anderson | Jan. 24, 1956 |
| 2,745,374 | Pikal | May 15, 1956 |
| 2,821,481 | Moslo | Jan. 28, 1958 |